United States Patent
Vitas (10) Patent No.: US 11,226,187 B2
(45) Date of Patent: Jan. 18, 2022

(54) TAPE MEASURE WITH RETRACTION SPRING ADJACENT TO TAPE REEL

(71) Applicant: Milwaukee Electric Tool Corporation, Brookfield, WI (US)

(72) Inventor: Jonathan F. Vitas, Muskego, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 204 days.

(21) Appl. No.: 16/534,543

(22) Filed: Aug. 7, 2019

(65) Prior Publication Data

US 2020/0033108 A1    Jan. 30, 2020

Related U.S. Application Data

(63) Continuation of application No. PCT/US2019/043063, filed on Jul. 23, 2019.

(60) Provisional application No. 62/702,724, filed on Jul. 24, 2018.

(51) Int. Cl.
    *G01B 3/1005*    (2020.01)

(52) U.S. Cl.
    CPC ...... *G01B 3/1005* (2013.01); *G01B 2003/103* (2013.01)

(58) Field of Classification Search
    CPC .................. G01B 3/1005; G01B 2003/103
    USPC .......................................................... 33/755
    See application file for complete search history.

(56) References Cited

U.S. PATENT DOCUMENTS

| | | | |
|---|---|---|---|
| 4,527,334 A * | 7/1985 | Jones ................... | G01B 3/1005 33/761 |
| 4,756,087 A * | 7/1988 | Sing ..................... | G01B 3/1005 33/765 |
| 6,347,462 B1 | 2/2002 | Steinich | |
| 6,964,114 B1 * | 11/2005 | Chen .................... | G01B 3/1005 242/371 |
| 7,003,895 B2 * | 2/2006 | Harris .................. | G01B 3/1005 33/755 |
| 7,360,320 B2 * | 4/2008 | Kelley ................. | G01B 3/1005 33/761 |
| 7,458,536 B2 * | 12/2008 | Hui ...................... | G01B 3/1041 242/375.3 |
| 9,874,428 B1 * | 1/2018 | Nelson ................. | H05K 999/99 |
| 10,132,605 B2 * | 11/2018 | Nelson ................. | G01B 3/1041 |
| 10,605,579 B2 * | 3/2020 | McKinster ........... | G01B 3/1005 |
| 10,836,603 B2 * | 11/2020 | Vitas .................... | G01B 3/1005 |
| 2018/0245903 A1 * | 8/2018 | McKinster ........... | G01B 3/1005 |
| 2018/0273341 A1 * | 9/2018 | Vitas .................... | G01B 3/1041 |

(Continued)

FOREIGN PATENT DOCUMENTS

| KR | 10-2011-0079936 | 7/2011 |
|---|---|---|
| WO | WO 2018-067716 | 4/2018 |

OTHER PUBLICATIONS

International Search Report and Written Opinion for International Publication No. PCT/US2019/043063 dated Oct. 25, 2019, 15 pages.

*Primary Examiner* — Yaritza Guadalupe-McCall
(74) *Attorney, Agent, or Firm* — Reinhart Boerner Van Deuren s.c.

(57) ABSTRACT

A tool, such as a tape measure, including a spring-based retraction system is shown. The retraction system includes a spiral spring that is located outside of and adjacent to a tape reel about which a tape blade is wound. This arrangement provides for a decreased housing height which improves the ability to grip and handle the tape measure.

20 Claims, 9 Drawing Sheets

(56) References Cited

U.S. PATENT DOCUMENTS

| | | | |
|---|---|---|---|
| 2018/0274894 A1* | 9/2018 | McKinster | G01B 3/1005 |
| 2019/0170491 A1* | 6/2019 | Khangar | G01B 3/1005 |
| 2020/0033108 A1* | 1/2020 | Vitas | G01B 3/1005 |
| 2021/0108907 A1* | 4/2021 | Nelson | H05K 999/99 |

* cited by examiner

TAPE MEASURE WITH RETRACTION SPRING ADJACENT TO TAPE REEL

CROSS-REFERENCE TO RELATED APPLICATION

The present application is a continuation of International Application No. PCT/US2019/043063, filed Jul. 23, 2019, which claims the benefit of and priority to U.S. Provisional Application No. 62/702,724, filed Jul. 24, 2018, both of which are incorporated herein by reference in their entirety.

BACKGROUND OF THE INVENTION

The present invention relates generally to the field of tools. The present invention relates specifically to a tape measure, measuring tape, retractable rule, etc., that includes a spring-based retraction system located outside of and/or adjacent to the tape reel.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned, storing energy as the tape is extended, and that releases energy to spin the reel, winding the blade back onto the reel. In typical tape measure designs, the spiral spring is located within the tape reel.

SUMMARY OF THE INVENTION

One embodiment of the disclosure relates to a tape measure with a housing, an axle, a tape reel, an elongate tape blade, and a spiral spring. The axle is mounted within the housing and has a longitudinal axis. The tape reel is rotatably mounted within the housing around the axle and defines a radially outward-facing surface. The elongate tape blade is wound around the radially outward-facing surface of the tape reel. The spiral spring is located within the housing and no spring is located between the tape blade and the longitudinal axis in the radial direction. When the elongate tape blade is unwound from the tape reel to extend from the housing the spiral spring stores energy, and the spiral spring releasing energy drives rewinding of the elongate tape blade on to the tape reel.

In one embodiment, a tape measure includes a housing, an axle, a tape reel, an elongate tape blade, and a spiral spring. The axle is mounted within the housing and defines a longitudinal axis. The tape reel is rotatably mounted within the housing around the axle and defines a radially outward-facing surface. The elongate tape blade is wound around the radially outward-facing surface of the tape reel. The spiral spring is located within the housing and no spring is located within the housing that has an outer diameter less than a diameter of the radially outward-facing surface of the tape reel.

In one embodiment, a tape measure includes a housing, an axle, a tape reel, an elongate tape blade, and a spiral spring. The axle is mounted within the housing and defines a longitudinal axis. The tape reel is rotatably mounted within the housing around the axle and defines a radially outward-facing surface and an inward-facing surface. The elongate tape blade is wound around the radially outward-facing surface of the tape reel. The spiral spring is located within the housing and a diameter of the axle is at least one-third of a diameter of the inward-facing surface of the tape reel.

One embodiment of the disclosure relates to a tape measure with a spring-based retraction system including a reel, a spiral spring and an axle. The reel and the spiral spring are rotatably coupled around the axle. The reel includes a radially outward facing surface about which a tape blade is wound. The spiral spring is located within the housing adjacent to the reel and/or adjacent to the tape blade such that the spiral spring is not surrounded in the radial direction by either the radially outward facing surface of the reel or the tape blade. In various embodiments, the outer diameter of the spiral spring is greater that the outer diameter of the radially outward facing surface. In some embodiments, the width of the spiral spring is less than the width of the tape blade.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a tape measure are shown. Various embodiments of the tape measure discussed herein include an innovative retraction system designed to provide for a compact and/or easy to hold housing while at the same time providing for a long tape length within such a housing having a relatively small size or easy to hold dimensions.

As will generally be understood, in certain tape measure designs, a spring (typically a spiral spring) stores energy during tape blade extension and applies a force/torque to a reel causing the tape blade to wind on to the reel during tape blade retraction. In the typical tape measure designs, the spring is located within a central cavity of the tape reel, and in such tape measure designs, increasing spring energy to provide for retraction of longer, wider and/or thicker measuring tape blades typically requires use of a larger spiral spring. In designs in which the retraction spring is located within the tape reel, increasing spring size often requires an increase of the height dimension of the tape measure housing to accommodate the increase in spring size. However, Applicant has determined that increasing tape measuring housing height leads to a housing shape that can be difficult for the user to hold.

Accordingly, as discussed herein, Applicant has developed various innovative tape measure blade retraction systems in which the retraction spring is located outside of and next to the tape reel. In this arrangement, the height dimension of the tape measure housing can be decreased because the spring does not need to fit within the tape reel, which in turn allows the diameter of the surface of the tape reel about which the tape blade is wound to be reduced to a small size based on the minimum coil diameter of the tape blade. Further, in the arrangements discussed herein, the retraction spring is located adjacent to the tape reel such that the retraction spring and tape reel share a common central rotational axis. In contrast to tape measure designs that include an off-axis external (relative to the tape reel) retraction spring, the retraction systems discussed herein do not require relatively complicated or potentially inefficient transmission mechanisms typically required in off-axis spring arrangements.

In addition, in various embodiments, the tape retraction system discussed herein may utilize a gear train coupled to the spring, tape reel and housing in a manner that allows for further optimization of tape measure size and/or control of tape measure retraction. In some such embodiments, the spring and tape reel are both coupled to a rotating arbor or axle. In some such embodiments, the gear train is a reduction gear train that translates each rotation of the tape reel to less than one rotation of the axle, which in turn translates to a smaller number of spring windings per rotation of the tape reel. In alternative embodiments, a gear train is not used. Further, in some embodiments, the tape measure includes a first spring located outside of the tape reel as discussed herein and a second spring located inside of the tape reel.

Figure 1:
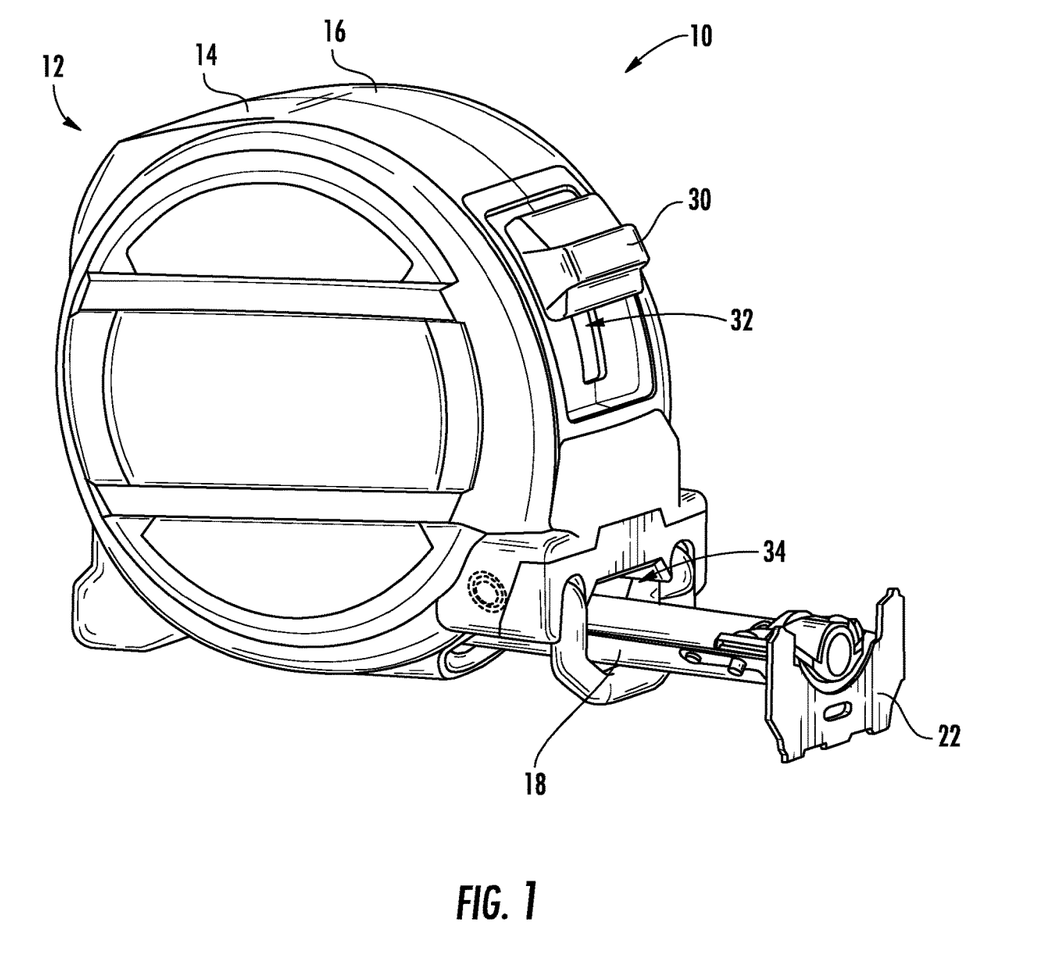
FIG. 1 is a perspective view of a tape measure, according to an exemplary embodiment.
Figure 2:
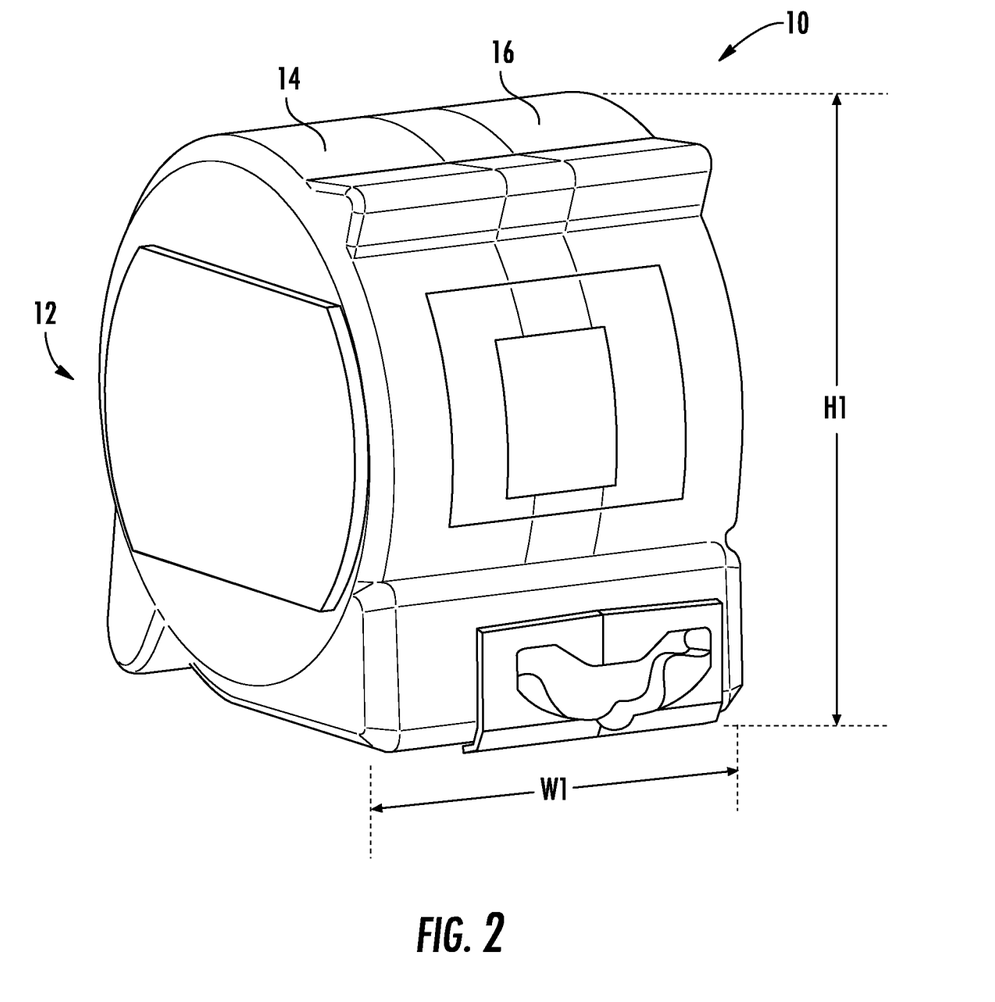
FIG. 2 is a perspective view of a housing for a tape measure with a retraction spring located outside of the tape reel, according to an exemplary embodiment.
Figure 3:
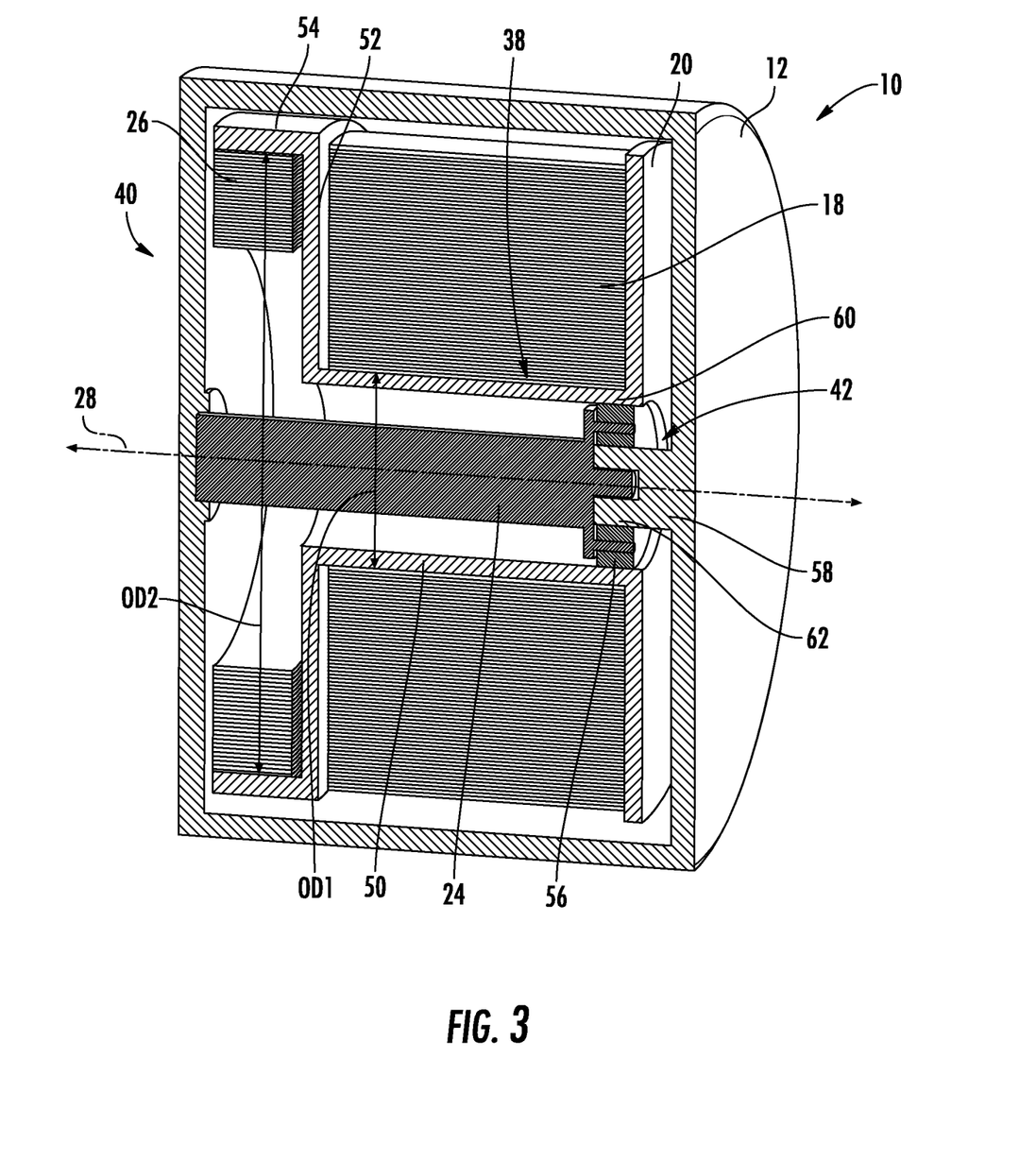
FIG. 3 is a cross-sectional perspective view of a tape measure including a retraction spring located outside of the tape reel, according to an exemplary embodiment.

Referring to FIGS. 1-3, a length measurement device, tape measure, measuring tape, retractable rule, etc., such as tape measure 10, is shown according to an exemplary embodiment. In general, tape measure 10 includes a housing 12 having a first part 14 and a second part 16. Tape measure 10 includes a tape blade 18 and, in the retracted position shown in FIGS. 1-3, tape blade 18 is wound or coiled onto a tape reel 20. In general, tape blade 18 is an elongated strip of material including a plurality of graduated measurement markings, and in specific embodiments, tape blade 18 is an elongated strip of metal material (e.g., steel material) that includes an outer most end coupled to a hook assembly 22. Tape blade 18 may include various coatings (e.g., polymer coating layers) to help protect tape blade 18 and/or the graduated markings of the blade from wear, breakage, etc.

FIG. 2 shows a detailed perspective view of tape housing 12. In general, the various spring based retraction systems discussed herein provide a tape housing with a relatively low height (for a given tape blade length) with a relatively large width that Applicant believes allows for improved handling/grip of the tape measure 10. As shown in FIG. 2, housing 12 has a maximum outer height dimension, H1, that is the dimension of the housing generally perpendicular to the tape blade during tape extension, and a maximum outer width dimension, W1, this is the dimension that is parallel to the width of tape blade 18.

In various embodiments, H1 is greater than W1. In various embodiments, H1 is between 60 mm and 120 mm, and W1 is between 40 mm and 70 mm. In a specific embodiment, the tape blade length is between 35 ft and 45 ft, H1 is between 75 mm and 100 mm, and W1 is between 54 mm and 60 mm. In a specific embodiment, the tape blade length is between 20 ft and 30 ft, H1 is between 60 mm and 85 mm, and W1 is between 52 mm and 58 mm. In various embodiments, the ratio of H1/W1 is relatively low (for a given tape length) compared to a typical tape measure with a retraction spring located within the tape reel. In various embodiments, H1/W1 is less than 2 and more specifically is between 1.7 and 1.1.

Referring to FIG. 1, a tape lock 30 is provided to selectively engage tape blade 18, which acts to hold tape blade 18 and reel 20 in place such that an extended segment of tape blade 18 remains at a desired length. A slot 32 is defined along a forward portion of housing 12. Slot 32 provides an opening in the tape measure housing 12, which allows tape lock 30 to extend into housing 12 and to engage with tape 18 or reel 20 within housing 12. In addition, slot 32 provides a length sufficient to allow tape lock 30 to be moved relative to housing 12 between locked and unlocked positions. Below slot 32, an opening, such as tape port 34, is provided in tape housing 12. In one embodiment, tape port 34 has an arcuate shape, corresponding to an arcuate cross-sectional profile of tape blade 18. Tape port 34 allows for the retraction and extension of tape blade 18 into and from housing 12 during tape extension and retraction.

Referring to FIG. 3, tape reel 20 is rotatably mounted within housing 12 and positioned around an axle 24. In the embodiment shown, axle 24 is rotatably mounted within housing 12 such that axle 24 is allowed to rotate relative to housing 12 during tape extension or retraction. However, in other embodiments, axle 24 may be fixed relative to housing.

As shown in FIG. 3, tape measure 10 includes a retraction system 40 that includes a spring, shown as spiral spring 26. In general, spiral spring 26 is coupled to tape reel 20 in a manner such that spiral spring 26 is coiled or wound to store energy during extension of tape 18 from housing 12 and is unwound, releasing energy, driving rewinding of tape 18 onto tape reel 20 during retraction of tape 18 (e.g., following release or unlocking of the tape 18). Specifically, when tape blade 18 is unlocked or released, spring 26 expands, driving tape reel 20 to wind up tape blade 18 and to pull tape blade 18 back into housing 12.

As shown in FIG. 3, the non-extended portion of tape 18 is wound onto a radially outward facing surface 38 a reel 20, which is surrounded by housing 12. Reel 20 is rotatably disposed about an axis 28 of tape measure 10 defined by axle 24, and spring 26 is coupled to reel 20 and configured to drive reel 20 about rotation axis 28, which in turn provides powered retraction of tape blade 18.

In general and in contrast to typical tape measure designs, spring 26 is located adjacent to and outside of the portion of reel 20 that supports the coiled portion of tape blade 18. In this arrangement, spring 26 is also located outside of and adjacent to the coiled portion of tape blade 18. Thus, in this arrangement, no portion of tape blade 18 or of surface 38 surrounds spring 26 in the radial direction. In other words, no portion of tape blade 18 or of surface 38 is located between spring 26 and housing 12 in the radial direction relative to axle 24.

As can be seen in FIG. 3, because spring 26 does not need to fit within surface 38 or within the coiled portion of tape blade 18, this arrangement allows the diameter of reel 20 measured at radially outward facing surface 38, shown as OD1, to be significantly smaller than in designs in which the retraction spring is located within surface 38 or within the coiled portion of tape blade 18. Further, in such embodiments, spring 26 has a maximum outer diameter, shown as OD2. In various embodiments, OD2 is greater than OD1, and specifically is greater than two times OD1. Further, in various embodiments, spring 26 has a width that is less than the width of tape blade 18, specifically a width that is less than half the width of tape blade 18, and more specifically, a width that is less than a third of the width of tape blade 18.

In addition, as can be seen in FIG. 3, spring 26 and tape blade 18 share a common rotational axis 28, defined by axle 24. Thus, spring 26 is located adjacent to and spaced from tape blade 18 along axis 28 within housing 12. In contrast to some tape measure designs with springs located outside of the tape reel, this arrangement allows spring 26 to be coupled to tape reel 20 via a single common rotational axle 24, without requiring a complicated transmission mechanism utilized in some tape measures with external, off-axis, retraction springs.

In the specific arrangement of FIG. 3, reel 20 includes a central barrel 50, a sidewall 52 and a spring spool, shown as spring wall 54. Central barrel 50 is a hollow cylindrical structure that defines radially outward facing surface 38 about which tape blade 18 is wound. Sidewall 52 is a flange structure that extends radially outward from central barrel 50. Spring wall 54 is a wall (e.g., a cylindrical wall) that extends outward from and perpendicular to sidewall 52 and that surrounds axis 28. In general, central barrel 50, a sidewall 52 and a spring wall 54 are formed from a rigid structure that rotate together within housing 12.

A radially outer end of spring 26 is coupled to spring wall 54, and a radially inner end of spring 26 is coupled to axle 24. The rigid construction of reel 20 couples spring 26 to tape blade 18 such that extension of tape blade 18 causes winding of spring 26, and unwinding of spring 26 drives rotation of reel 20 and retraction of tape blade 18.

In the specific embodiment shown in FIG. 3, axle 24 is rotatably coupled to housing 12, and retraction system 40 includes a gear train 42. In general, gear train 42 is coupled between axle 24 and tape reel 20 allowing the number of rotations of axle 24 produced in response to each rotation of reel 20 to be selected based on the designed gear ratio of gear train 42. This in turn allows for control of the number of turns experienced by spring 26 in response to each turn of reel 20 which allows for control of the torque profile and retraction characteristics of spring 26.

As shown in FIG. 3, gear train 42 includes a plurality of planetary gears 56 located between tape reel 20 and housing post 58. As will be understood, in this arrangement, a ring gear 60 is formed along a portion of the inner diameter of tape reel 20, and a central or sun gear 62 is formed along an outer diameter of housing post 58.

It should be understood that in other embodiments, retraction system 40 need not include gear train 42. In some such embodiments, axle 24 may be directly coupled to reel 20, and the inner end of spring 26 may be coupled to an inner spring spool which is coupled to axle 24 via gearing.

Further, while FIG. 3 shows a single spring 26 located on the left side of reel 20, in other embodiments, tape measure 10 can include two springs 26, one located on either side of reel 20 along axis 28. In some dual-spring embodiments, the two springs 26 may function in series with each other, and in another embodiment, the two springs 26 may function in parallel with each other.

As will be understood, utilizing some epicyclic gear arrangements in which the input of the gear train is coupled to reel 20, the output is coupled to axle 24 and spring 26 is coupled between reel 20 and axle 24, spring 26 is wound in the same direction as rotation of reel 20 during tape extension, and in other embodiments, spring 26 is wound in the opposite direction of rotation of reel 20 during tape extension.

Figure 4:
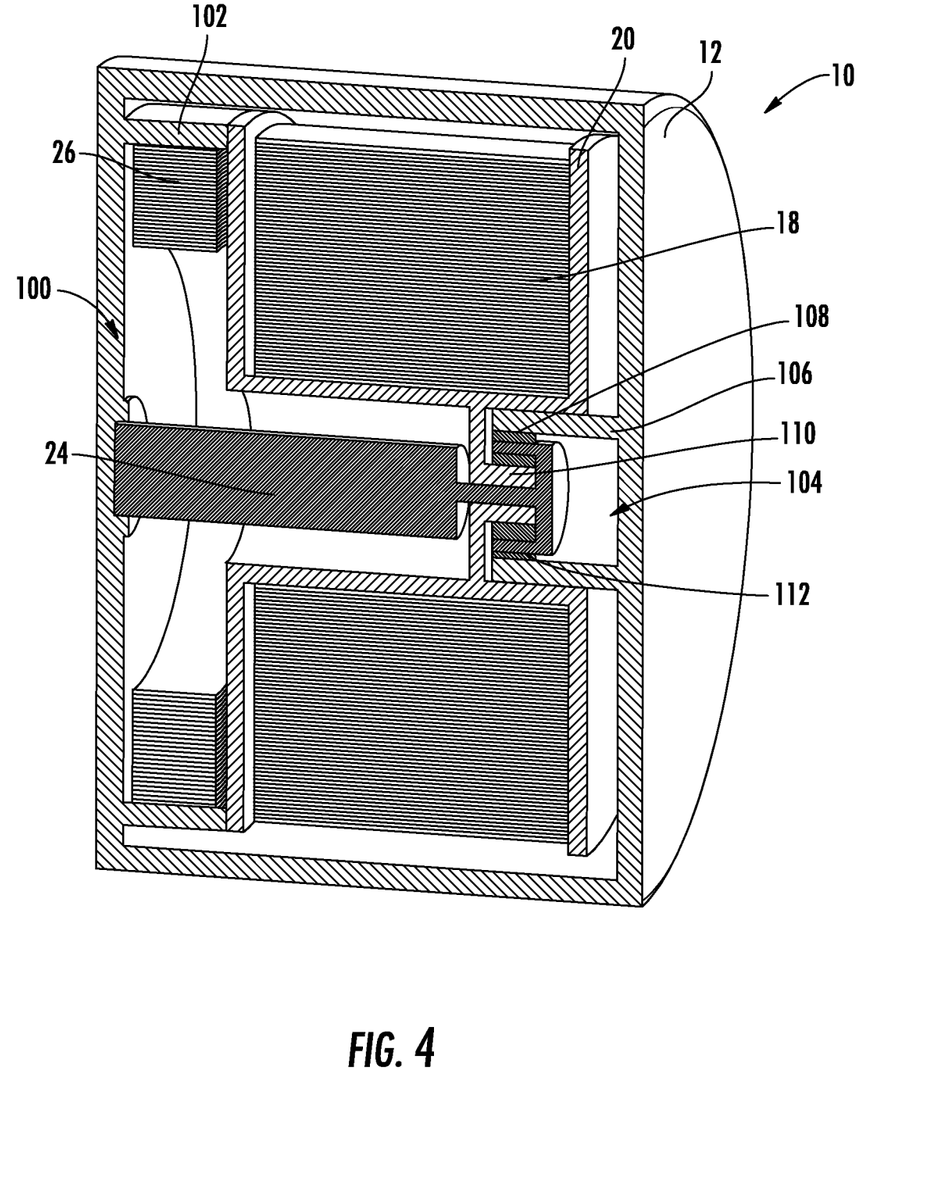
FIG. 4 is a cross-sectional perspective view of a tape measure including a retraction spring located outside of the tape reel, according to another exemplary embodiment.
Figure 5:
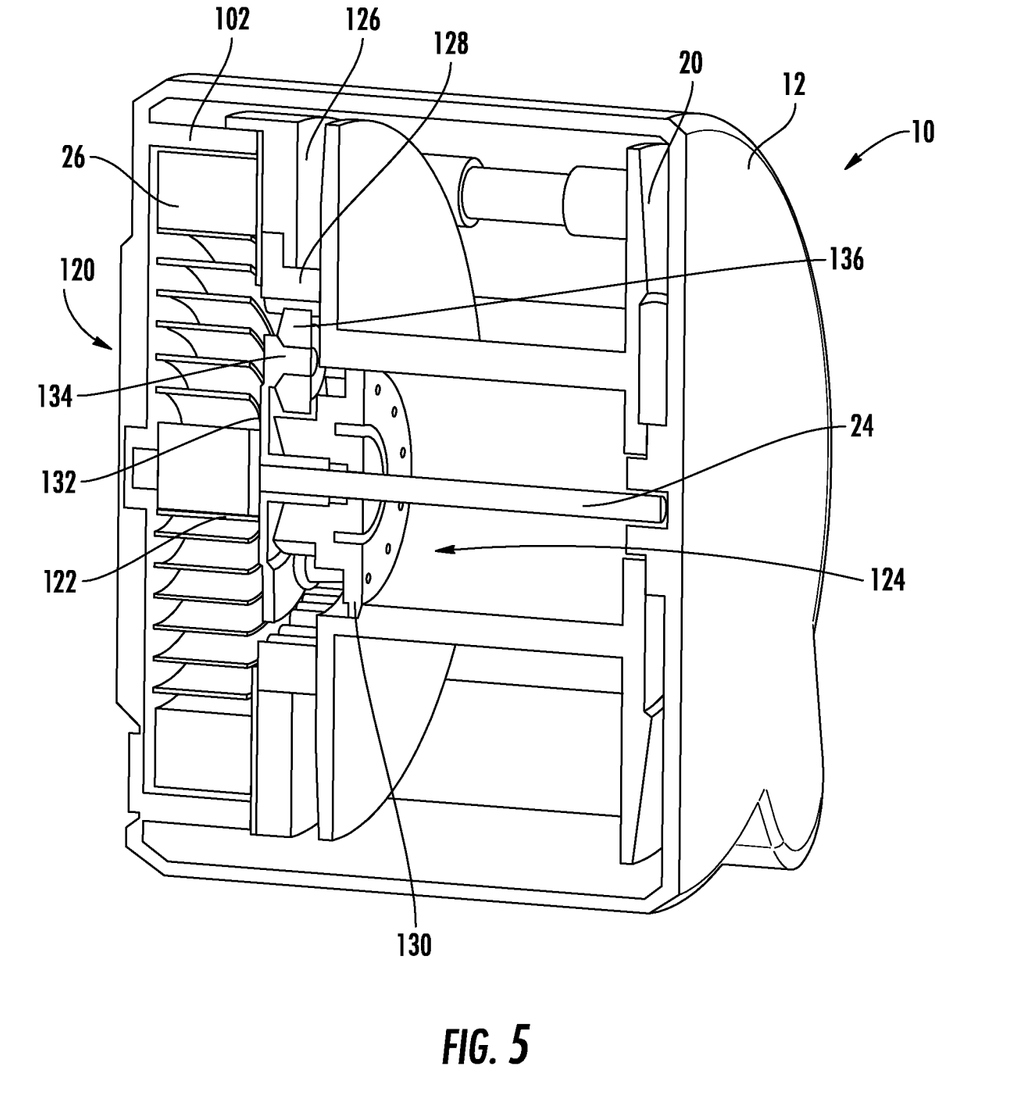
FIG. 5 is a cross-sectional perspective view of a tape measure including a retraction spring located outside of the tape reel, according to another exemplary embodiment.
Figure 6:
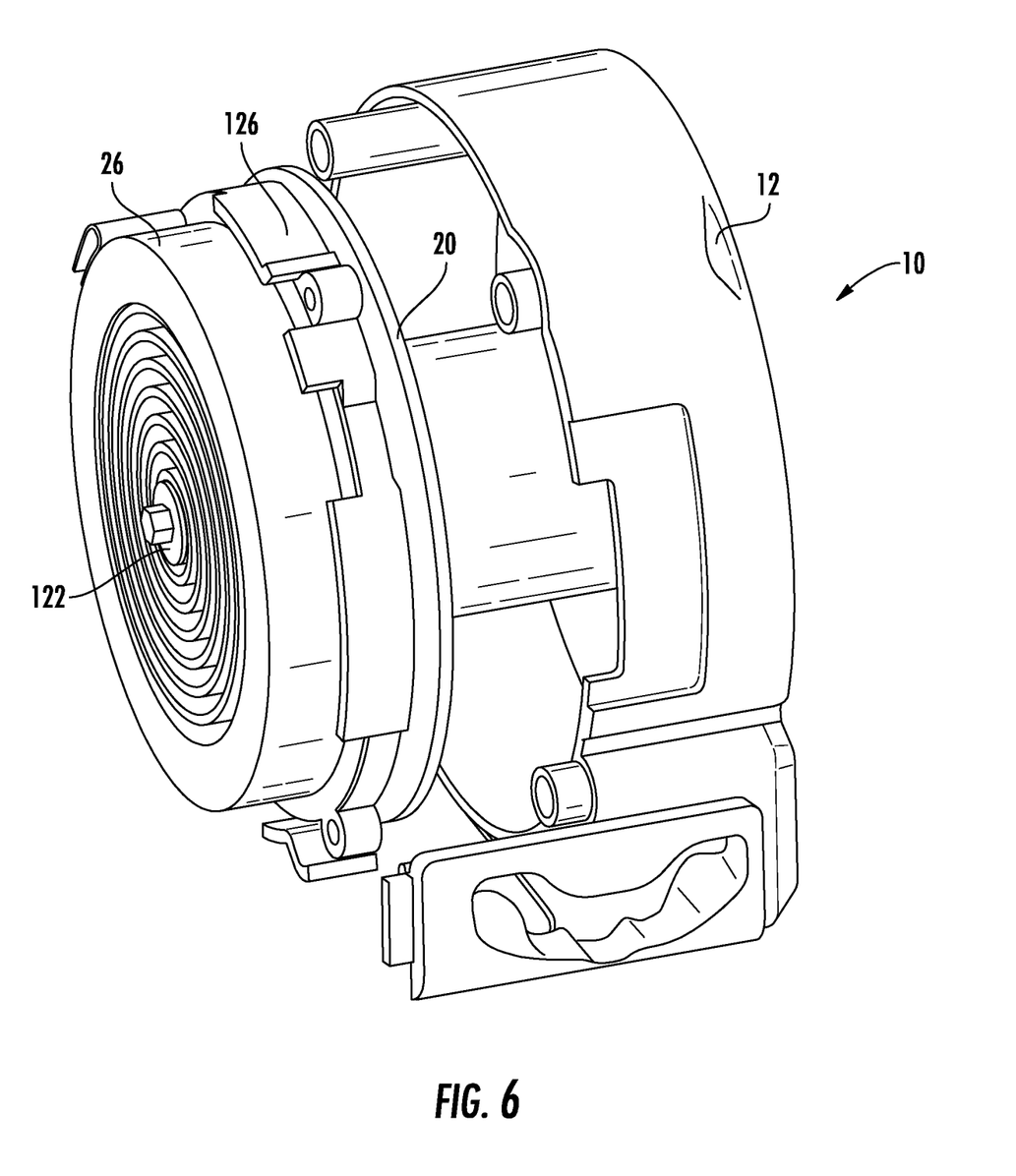
FIG. 6 is a perspective view of the tape measure of FIG. 5 with a portion of the housing removed showing the retraction spring, according to an exemplary embodiment.
Figure 7:
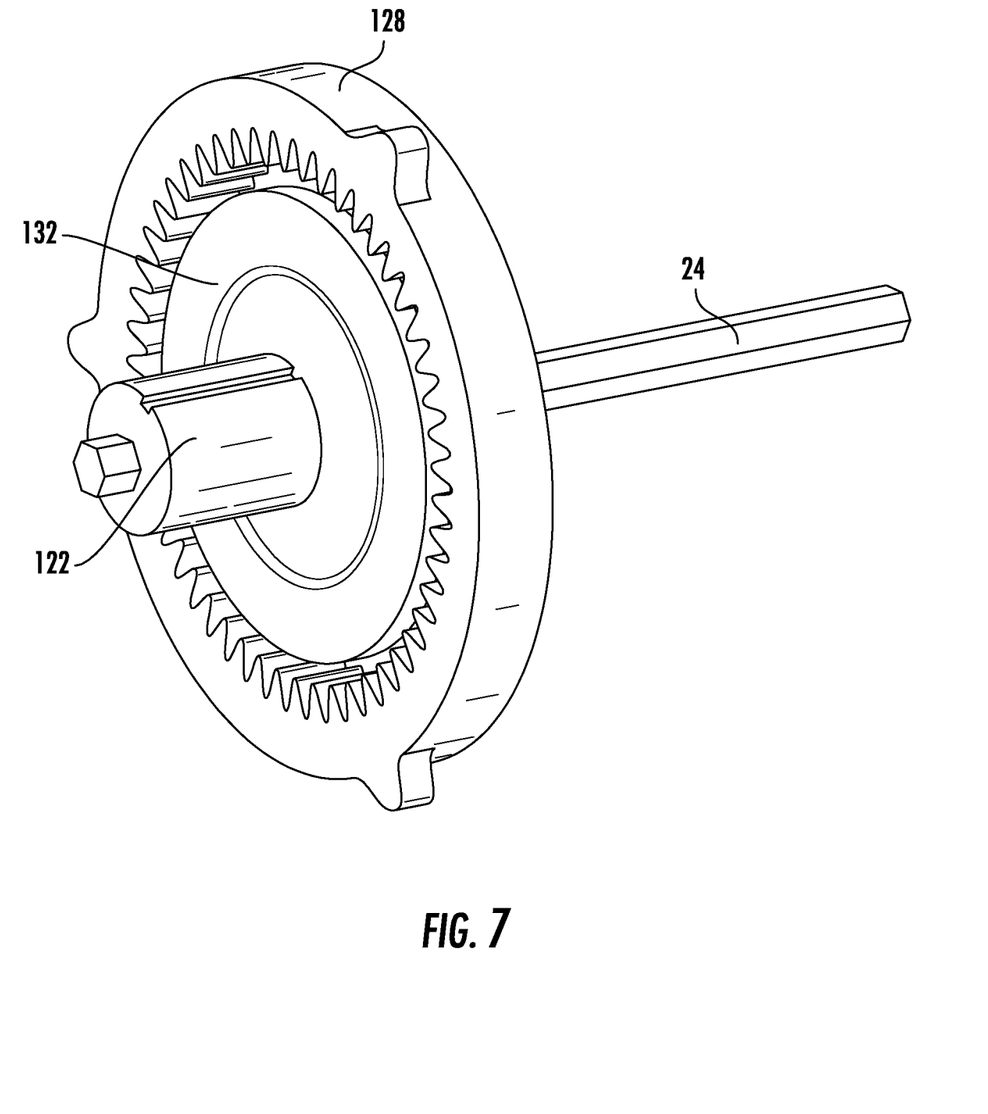
FIG. 7 is a first perspective view of a gear train of the retraction system of the tape measure of FIG. 5, according to an exemplary embodiment.
Figure 8:
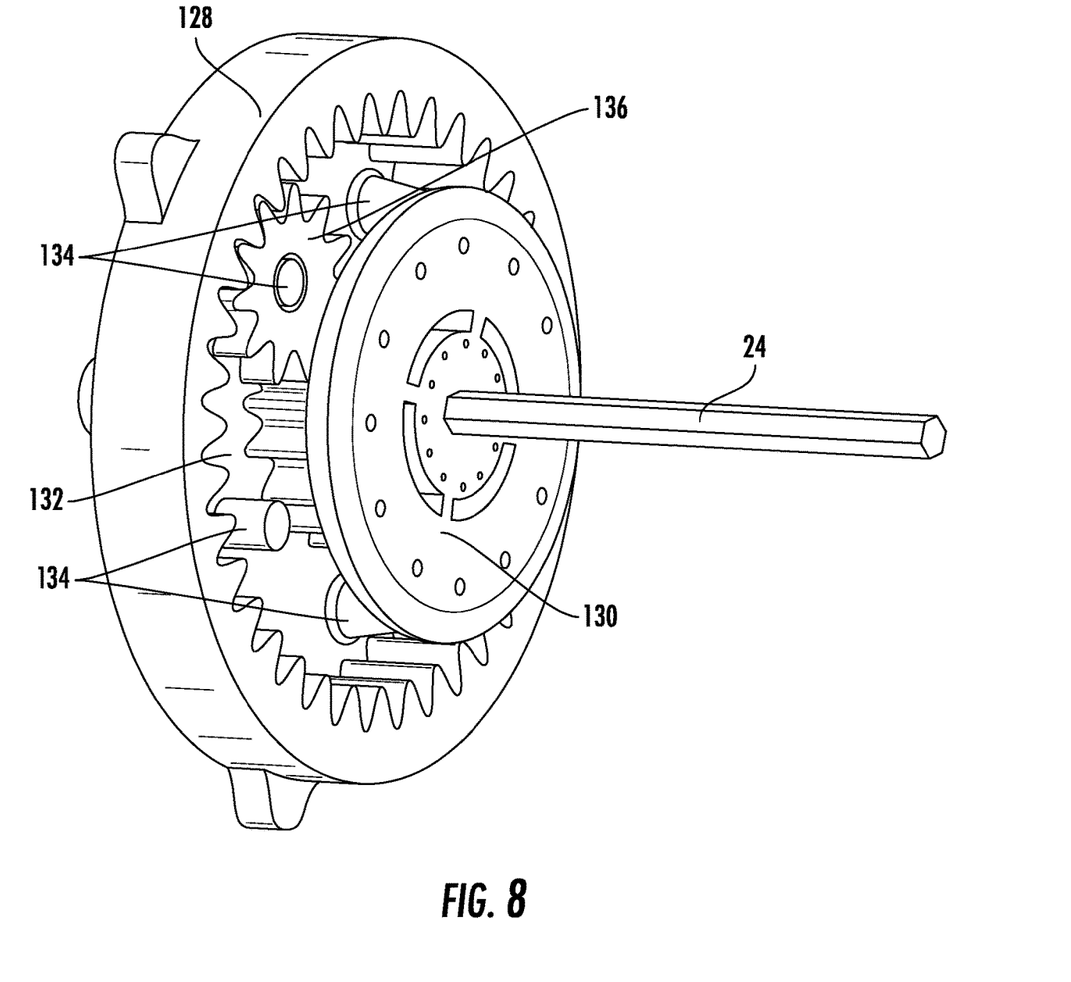
FIG. 8 is a second perspective view of a gear train of the retraction system of the tape measure of FIG. 5, according to an exemplary embodiment.

Referring to FIG. 4, another embodiment of tape measure 10 including a spiral spring based retraction system, such as retraction system 100, is shown and described. In general, retraction system 100 is substantially the same as retraction system 40 discussed above, except for the differences discussed herein. Similar to retraction system 40, retraction system 100 is configured to transmit rotational movement of tape reel 20 (e.g., during tape extension) to winding of spring 26, and upon release of tape blade 18, expansion of spring 26 drives rewinding of tape blade 18 onto tape reel 20.

As shown in FIG. 4, retraction system 100 includes a spring spool, shown as cylindrical wall 102. Cylindrical wall 102 is rigidly coupled to housing 12, and in a specific embodiment, cylindrical wall 102 is formed from a single integral piece of material with a portion of housing 12. A radially outer end of spring 26 is coupled to cylindrical wall 102, and a radially inner end of spring 26 is coupled to axle 24. In this embodiment, axle 24 is rotatably coupled to housing 12, and the fixed connection between spring 26 and wall 102 allows spring 26 to be wound around axle 24 during tape extension.

Further, in the embodiment shown in FIG. 4, retraction system 100 includes a gear train 104. In this arrangement, a ring gear wall, shown as cylindrical wall 106, is rigidly coupled to housing 12, and in a specific embodiment, cylindrical wall 106 is formed from a single integral piece of material with a portion of housing 12. A ring gear 108 is coupled to cylindrical wall 106. A central or sun gear 110 is coupled to tape reel 20. One or more planetary gears 112 are coupled to axle 24.

Similar to gear train 42, gear train 104 is coupled between axle 24 and tape reel 20 allowing the number of rotations of axle 24 produced in response to each rotation of reel 20 to be selected based on the gear ratio of gear train 104. This in turn allows for control of the number of turns experienced by spring 26 in response to each turn of reel 20 allowing for control of the torque profile and retraction characteristics of spring 26.

Referring to FIGS. 5-8, another embodiment of tape measure 10 including a spiral spring based retraction system, such as retraction system 120, is shown and described. In general, retraction system 120 is substantially the same as retraction systems 40 and 100 discussed above, except for the differences discussed herein. Similar to retraction system 40, retraction system 120 is configured to transmit rotational movement of tape reel 20 (e.g., during tape extension) to winding of spring 26, and upon release of tape blade 18, expansion of spring 26 drives rewinding of tape blade 18 onto tape reel.

Retraction system 120 includes a spring spool, shown as cylindrical wall 102, and a spring arbor or axle 122. A radially outer end of spring 26 is coupled to cylindrical wall 102, and a radially inner end of spring 26 is coupled to spring axle 122.

In the embodiment shown in FIGS. 5-8, retraction system 120 includes a gear train 124. In this arrangement, a connecting structure, shown as disk 126, is rigidly coupled to housing 12. In various embodiments, disk 126 is a component separate from housing 12 that is rigidly coupled to housing 12, and in other embodiments, disk 126 is integrally formed with housing 12.

A ring gear 128 is coupled to disk 126. A central or sun gear 130 is coupled to tape reel 20. One or more planetary gears 112 are coupled to axle 24. A gear carrier 132 is coupled to spring axle 122. Gear carrier 132 includes one or more posts 134 that support one or more planetary gears 136 located between sun gear 130 and ring gear 128. It should be understood that while FIGS. 5-8 show a single planetary gear 136, in some embodiments, each post of gear carrier 132 supports a planetary gear 136.

Similar to gear train 42, gear train 124 is coupled between spring axle 122 and tape reel 20 allowing the number of rotations of spring axle 122 produced in response to each rotation of reel 20 to be selected based on the gear ratio of gear train 124. This in turn allows for control of the number of turns experienced by spring 26 in response to each turn of reel 20 allowing for control of the torque profile and retraction characteristics of spring 26.

In various embodiments, the gear trains discussed herein may provide a variety of gear ratios to provide a desired level of winding of spring 26 in response to each rotation of reel 20. In various embodiments, the gear ratio provided by gear trains 42, 104 and/or 124 is between 1.5 and 6.5, specifically between 2.5 and 4.5 and more specifically between 3 and 4. In specific embodiments, gear trains 42, 104 and/or 124 have a gear ratio of 3.1, 3.4 or 3.75.

In various embodiments discussed herein, spring 26 is formed from SK4 steel having a thickness of 0.38 mm and a width of 10 mm. In various embodiments, spring 26 has an active length of 38-40 mm and a formed coil diameter of 35-40 mm.

In various embodiments, the components of retraction system 120 maybe coupled or connected in various arrangements. In one embodiment, axle 24, carrier 132 and spring axle 122 are rigidly coupled together such that all three components rotate together within the tape measure housing.

In one such embodiment, axle 24, carrier 132 and spring axle 122 are formed from a single, integral piece of material. In another embodiment, axle 24 is rotatably coupled relative to the housing and relative to carrier 132 and to spring axle 122. In another embodiment, axle 24 is rigidly fixed to the housing and carrier 132 and axle 122 rotate about axle 24.

In various embodiments, tape measure 10 can include tape blades 18 having various maximum extended lengths. In specific embodiments, the maximum extended length of tape blade 18 is less than 50 feet or more specifically less than 40 feet. In various embodiments, the length of tape blade 18 is between 15 ft. and 40 ft., and in specific embodiments, the length of the tape blade 18 is 35 ft., 30 ft., 25 ft., or 16 ft.

In various embodiments, gear trains 42, 104 or 124 may be any one of a variety of epicyclic gear train designs. In specific embodiments, gear trains 42, 104 or 124 are any one of the gear arrangements shown and described in ANSI/AGMA 6123-B06. In other embodiments, gear trains 42, 104 or 124 include two or more epicyclic gear arrangements connected to each in series in which the input of a first epicyclic gear arrangement is coupled to reel 20, the output of the first epicyclic gear arrangement is coupled to the input of a second gear arrangement, and the output of the second epicyclic gear arrangement is coupled to axle 24. This pattern can be repeated for gear trains 42, 104 or 124 that include, 3, 4, 5, etc. epicyclic gear trains in series. In other embodiments, gear trains 42, 104 or 124 are a gear arrangement not described in ANSPAGMA 6123-B06.

Examples

Table 1 below shows details of various tape measure designs according to the various specific designs according to exemplary embodiments discussed herein.

TABLE 1

| Tape Length (ft) | Tape Flat Width (mm) | Tape Total Thickness (mm) | Tape Spool Minor Diameter (mm) | Tape OD (mm) | Housing Height (mm) | Housing Width (mm) | Spring Thickness (mm) | Spring Width (mm) | Gear Ratio |
|---|---|---|---|---|---|---|---|---|---|
| 40.6 | 30.5 | 0.36 | 20 | 83.14 | 95.14 | 55.1 | 0.35 | 10 | 2.8 |
| 40.6 | 30.5 | 0.36 | 20 | 83.14 | 95.14 | 55.1 | 0.38 | 10 | 3.4 |
| 40.6 | 30.5 | 0.36 | 20 | 83.14 | 95.14 | 55.1 | 0.45 | 10 | 4.3 |
| 40.6 | 30.5 | 0.36 | 20 | 83.14 | 95.14 | 55.1 | 0.5 | 10 | 5.3 |
| 40.6 | 30.5 | 0.36 | 20 | 83.14 | 95.14 | 55.1 | 0.55 | 10 | 6.8 |
| 40.6 | 30.5 | 0.18 | 30 | 65.97 | 77.97 | 58.1 | 0.3 | 13 | 3.5 |
| 40.6 | 30.5 | 0.18 | 30 | 65.97 | 77.97 | 58.1 | 0.35 | 13 | 4.3 |
| 40.6 | 30.5 | 0.18 | 30 | 65.97 | 77.97 | 58.1 | 0.45 | 13 | 7 |
| 25.6 | 30.5 | 0.36 | 20 | 67.06 | 79.06 | 54.1 | 0.3 | 9 | 2.4 |
| 25.6 | 30.5 | 0.36 | 20 | 67.06 | 79.06 | 54.1 | 0.4 | 9 | 3.8 |
| 25.6 | 30.5 | 0.36 | 20 | 67.06 | 79.06 | 54.1 | 0.5 | 9 | 6.3 |
| 25.6 | 30.5 | 0.18 | 30 | 55.42 | 67.42 | 56.1 | 0.25 | 11 | 2.5 |
| 25.6 | 30.5 | 0.18 | 30 | 55.42 | 67.42 | 56.1 | 0.3 | 11 | 3.4 |
| 25.6 | 30.5 | 0.18 | 30 | 55.42 | 67.42 | 56.1 | 0.4 | 11 | 5.7 |

Figure 9:
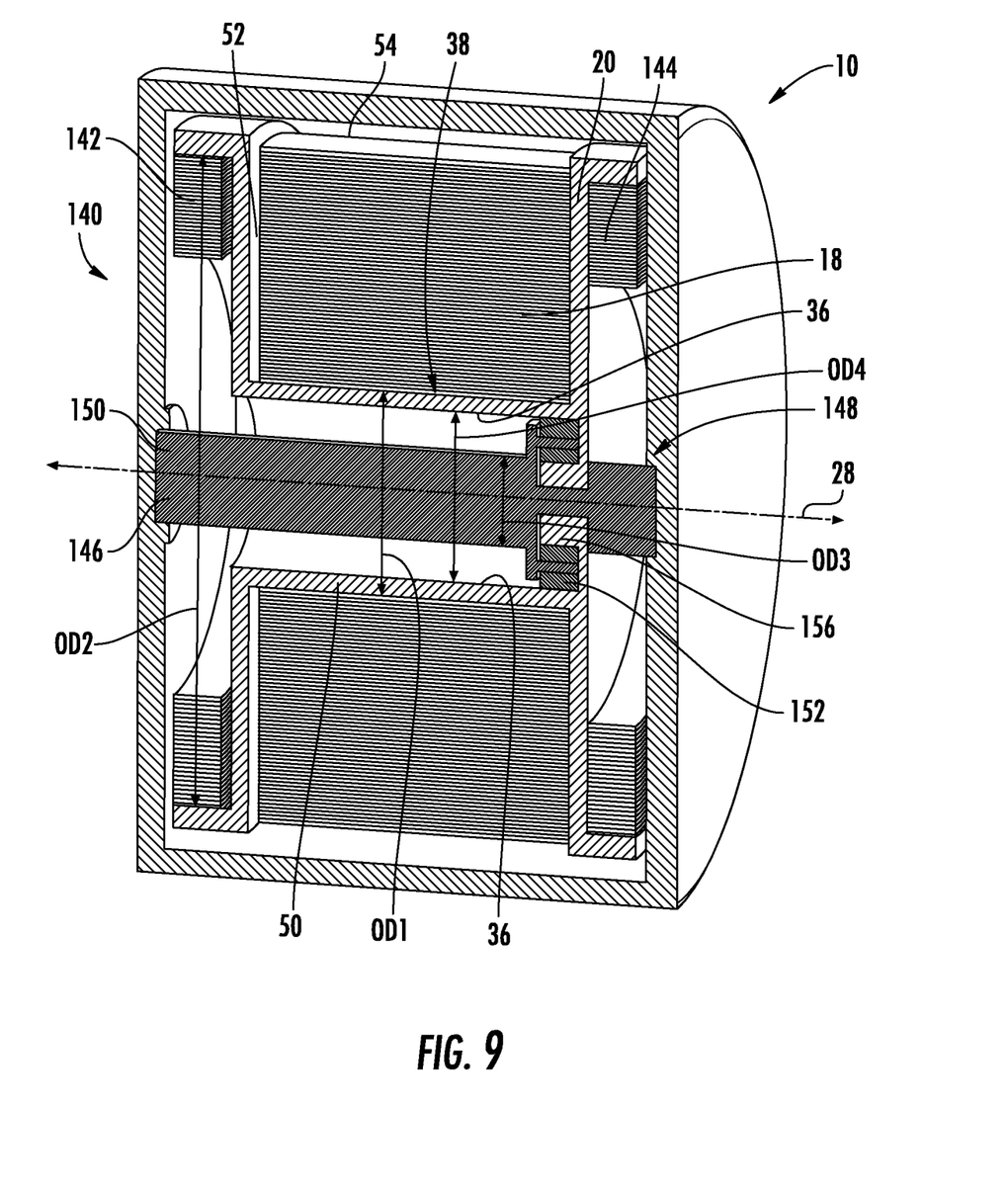
FIG. 9 is a cross-sectional perspective view of a tape measure including a retraction spring located outside of the tape reel, according to an exemplary embodiment.

Referring to FIG. 9, another embodiment of tape measure 11 including a spiral spring based retraction system, such as retraction system 140, is shown and described. In general, retraction system 140 is substantially the same as retraction systems 40, 100 and 120 discussed above, except for the differences discussed herein. Retraction system 140 includes first spring 142 and second spring 144, which are arranged on either side of tape reel 20 along longitudinal axis 28. Similar to retraction systems 40, 100, and 120, retraction system 140 is configured to transmit rotational movement of tape reel 20 (e.g., during tape extension) to winding of springs 142 and 144, and upon release of tape blade 18, expansion of springs 142 and 144 drives rewinding of tape blade 18 onto tape reel 20.

Further, in the embodiment shown in FIG. 9, retraction system 140 includes a gear train 148. Gear train 148 includes a plurality of planetary gears 152 located between tape reel 20 and sun gear 156. A central or sun gear 156 is coupled to tape reel 20, and planetary gears 154 are coupled to axle 146.

Similar to gear trains 42, 104 and 124, gear train 148 is coupled between axle 146 and tape reel 20 allowing the number of rotations of axle 146 produced in response to each rotation of reel 20 to be selected based on the gear ratio of gear train 148. This in turn allows for control of the number of turns experienced by springs 142 and 144 in response to each turn of reel 20 allowing for control of the torque profile and retraction characteristics of springs 142 and 144.

Axle 146 includes a component, shown as cylinder 150, that extends along a majority (e.g., at least 50%) of a length of axle 146 along longitudinal axis 28. In various embodiments axle 146 includes an annular wall defining a cylindrical surface having an interior that is at least partially hollow. Cylinder 150 defines a diameter OD3. Outward-facing surface 38 of tape reel 20 defines a diameter OD1 and inward-facing surface 36 of tape reel 20 defines a diameter OD4.

In various embodiments there is no spring between tape blade 18 and axle 24 in a radial direction, and more generally between tape reel 20 and longitudinal axis 28 in a radial direction. As a result, the ratio of diameter OD1 of outward-facing surface 38 to diameter OD3 of axles 24, 122 and/or 146 may be less than in other tape measures in which a spiral spring is radially located between the tape reel and the axle. In one embodiment, diameter OD3 of cylinder 150 is at least one-fourth as long as diameter OD1 of outward-facing surface 38, and more specifically diameter OD3 of cylinder 150 is at least one-third as long as diameter OD1 of outward-facing surface 38, and more specifically diameter OD3 of cylinder 150 is at least 35% as long as diameter OD1 of outward-facing surface 38, and more specifically diameter OD3 of cylinder 150 is at least 40% as long as diameter OD1 of outward-facing surface 38.

In various embodiments the ratio of diameter OD4 of inward-facing surface 36 to diameter OD3 of axles 24, 122 and/or 146 may be less than in other tape measures in which a spiral spring is radially located between the tape reel and the axle. In one embodiment, diameter OD3 of cylinder 150 is at least one-fourth as long as diameter OD4 of inward-facing surface 36, and more specifically diameter OD3 of cylinder 150 is at least one-third as long as diameter OD4 of inward-facing surface 36, and more specifically diameter OD3 of cylinder 150 is at least 35% as long as diameter OD4 of inward-facing surface 36, and more specifically diameter OD3 of cylinder 150 is at least 40% as long as diameter OD4 of inward-facing surface 36.

In various embodiments, no spring located within housing 12 has an outer diameter less than radially-outward facing surface 38 of tape reel 20.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
a housing;
an axle having a longitudinal axis, the axle is mounted within the housing;
a tape reel rotatably mounted within the housing around the axle, wherein the tape reel defines a radially outward-facing surface;
an elongate tape blade wound around the radially outward-facing surface of the tape reel; and
a spiral spring located within the housing, wherein when the elongate tape blade is unwound from the tape reel to extend from the housing the spiral spring stores energy, wherein the spiral spring releasing energy drives rewinding of the elongate tape blade on to the tape reel, and wherein no spring is located between the tape blade and the longitudinal axis in the radial direction, wherein the spiral spring is a first spiral spring and the tape measure comprises a second spiral spring located within the housing, and wherein the first spiral spring and the second spiral spring are located on opposing sides of the tape reel along the longitudinal axis.

2. The tape measure of claim 1, wherein no spring is located between the tape reel and the longitudinal axis in the radial direction.

3. The tape measure of claim 1, wherein the first spiral spring, the second spiral spring, and the tape reel rotate around the longitudinal axis, and wherein the axle rotates with respect to the housing.

4. The tape measure of claim 1, wherein the tape reel comprises a central barrel that defines the radially outward surface around which the tape blade is wound, a sidewall that extends radially outward-facing from the central barrel, and a spring wall that extends outward from the sidewall around the longitudinal axis, and wherein an outer end of the first spiral spring is coupled to the spring wall.

5. The tape measure of claim 1, the tape measure further comprises a gear train that is coupled between the axle and the tape reel, wherein during extension of the elongate tape blade from the housing, each full rotation of the tape reel results in less than a full rotation of the axle.

6. The tape measure of claim 5, wherein the gear train comprises a plurality of planetary gears and a central sun gear and has a gear ratio greater than 1.5.

7. A tape measure comprising:
a housing;
an axle having a longitudinal axis, the axle is mounted within the housing;
a tape reel rotatably mounted within the housing around the axle, the tape reel defining a radially outward-facing surface;
an elongate tape blade wound around the radially outward-facing surface of the tape reel; and
a spiral spring located within the housing, wherein when the elongate tape blade is unwound from the tape reel to extend from the housing the spiral spring stores energy, wherein the spiral spring releasing energy drives rewinding of the elongate tape blade on to the tape reel, and wherein no spring located within the housing has an outer diameter that is less than a diameter of the radially outward-facing surface of the tape reel, wherein the spiral spring defines a width less than half a width of the tape blade.

8. The tape measure of claim 7, wherein the spiral spring is a first spiral spring and the tape measure comprises a second spiral spring located within the housing, and wherein the first spiral spring and the second spiral spring are located on opposing sides of the tape reel along the longitudinal axis.

9. The tape measure of claim 7, wherein the tape reel comprises a central barrel that defines the radially outward-facing surface around which the tape blade is wound, a sidewall that extends radially outward from the central barrel, and a spring wall that extends outward from the sidewall around the longitudinal axis, and wherein an outer end of the spiral spring is coupled to the spring wall.

10. The tape measure of claim 7, the tape measure further comprises a gear train that is coupled between the axle and the tape reel, wherein the gear train comprises a plurality of planetary gears and a central sun gear.

11. The tape measure of claim 10, wherein the gear train provides a gear ratio during extension of the elongate tape blade from the housing such that tape reel rotations to axle rotations has a ratio between 2.5 and 4.5.

12. The tape measure of claim 7, the housing defining a maximum height perpendicular to the tape blade during tape blade extraction, and the housing defining a maximum width parallel to the width of the tape blade, wherein a ratio of the maximum height to the maximum width is less than 2:1.

13. A tape measure comprising:
a housing;
an axle having a longitudinal axis, the axle is mounted within the housing;
a tape reel rotatably mounted within the housing around the axle, the tape reel defining a radially outward-facing surface and an inward-facing surface;
an elongate tape blade wound around the outward-facing surface of the tape reel; and
a spiral spring located within the housing, wherein when the elongate tape blade is unwound from the tape reel to extend from the housing the spiral spring stores energy, wherein the spiral spring releasing energy drives rewinding of the elongate tape blade on to the tape reel, and wherein a diameter of the axle is at least one-third of a diameter of the outward-facing surface of the tape reel.

14. The tape measure of claim 13, wherein the axle comprises a cylindrical outer surface that extends along a majority of a length of the axle, and wherein the diameter of the axle is a diameter of the cylindrical outer surface.

15. The tape measure of claim 14, wherein the axle rotates with respect to the housing, the tape measure further comprises a gear train that is coupled between the axle and the tape reel.

16. The tape measure of claim 15, wherein the gear train comprises a plurality of planetary gears and a central sun gear.

17. The tape measure of claim 16, wherein the gear train provides a gear ratio during extension of the elongate tape blade from the housing such that tape reel rotations to axle rotations has a ratio between 2.5 and 4.5.

18. The tape measure of claim 17, wherein the gear ratio is between 3 and 4.

19. The tape measure of claim 18, wherein there is no spring between the axle and the tape blade in the radial direction.

20. The tape measure of claim 13 wherein the spiral spring is a first spiral spring and the tape measuring comprises a second spiral spring located within the housing, and wherein the first spiral spring and the second spiral spring are located on opposing sides of the tape reel along the longitudinal axis.

* * * * *